United States Patent

[11] 3,548,986

[72] Inventor Alan R. Fisher
 Highland Park, Mich.
[21] Appl. No. 795,409
[22] Filed Jan. 31, 1969
[45] Patented Dec. 22, 1970
[73] Assignee Ford Motor Company
 Dearborn, Mich.
 a corporation of Delaware

[54] FLEXIBLE PISTON CONE CLUTCH
 5 Claims, 4 Drawing Figs.
[52] U.S. Cl. .................................................. 192/85,
 192/65, 192/88; 188/152
[51] Int. Cl. ...................................................... F16d 25/00
[50] Field of Search............................................ 192/88A,
 88B, 85A, 85A2, 65; 188/152.86A, 152.87

[56] References Cited
UNITED STATES PATENTS

| | | | |
|---|---|---|---|
| 1,300,898 | 4/1919 | Vincent........................ | 192/85A |
| 2,637,308 | 5/1953 | Dodge........................... | 192/85VX |
| 2,755,901 | 7/1956 | Fippard........................ | 192/85A |
| 2,966,237 | 12/1960 | Galleher....................... | 188/152.86AX |

Primary Examiner—Benjamin W. Wyche
Attorneys—John R. Faulkner and Donald J. Harrington ABSTRACT: A friction torque establishing device adapted to transmit torque between two relatively movable members comprising a cone clutch element carried by one of said members, a flexible piston diaphragm carried by another of said members and defining a second cone clutch element, said piston diaphragm cooperating with the other member to define a fluid pressure chamber, the clutch elements being urged into frictional engagement upon an increase in the fluid pressure in said chamber, the piston diaphragm being adapted to yield under fluid pressure to provide a high degree of compliance between the friction surfaces on said clutch elements.

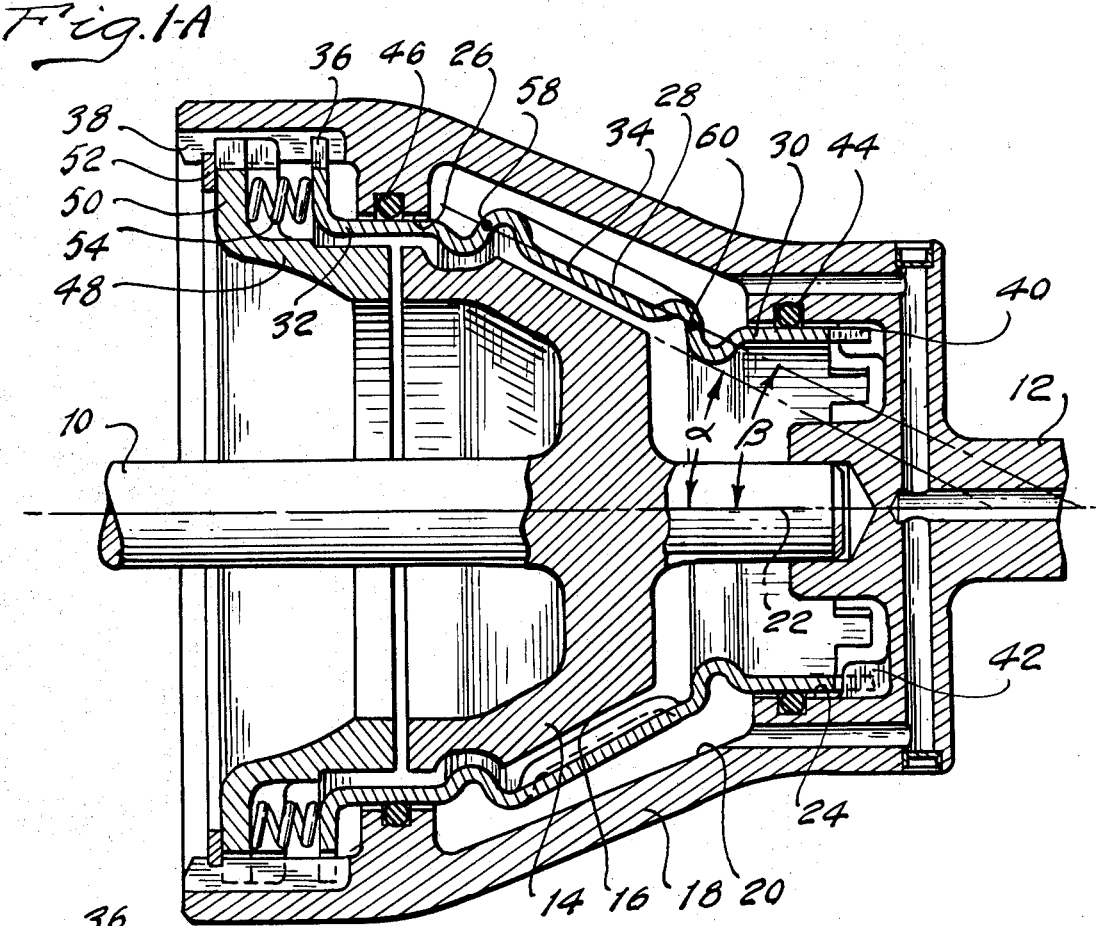
Fig.1-A
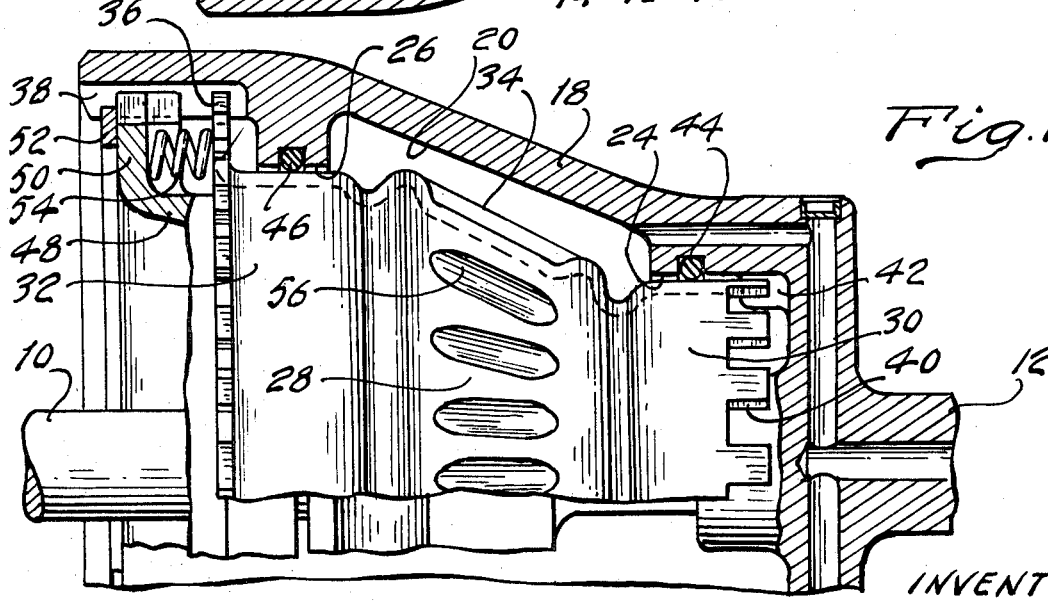
Fig.1-B
INVENTOR:
ALAN R. FISHER

INVENTOR:
ALAN R. FISHER
ATTORNEYS.

3,548,986

FLEXIBLE PISTON CONE CLUTCH

GENERAL DESCRIPTION OF THE INVENTION

My invention is adapted especially to be used in an automatic power transmission mechanism for controlling relative motion of gear elements of the mechanism to establish multiple speed ratio changes. It may be used as a transmission clutch although it may function also as a friction brake for an automatic transmission. The preferred embodiments of my invention disclosed in this specification are in the form of friction clutches. Each embodiment may be used to establish and disestablish a driving connection between two torque delivery elements in a transmission gear system.

It is common practice in an arrangement of this type to provide friction discs having internal and external splines situated in interdigital relationship. The discs with the internal splines are carried by one clutch member, and the discs with the external splines are carried by a companion clutch member. One of the clutch members defines an annular cylinder within which is situated in an annular piston. Fluid pressure is distributed selectively to the pressure chamber defined by the cylinder and the piston. As the piston is actuated in response to a pressure buildup in the fluid pressure chamber, the friction discs become engaged thereby connecting together the respective clutch members. Such an arrangement requires a relatively large radial dimension of the clutch structure. In certain structural environments the increased dimension of the clutch is a disadvantage since the space available for the clutch is insufficient to permit a clutch hub of large enough dimension to provide the necessary torque capacity.

The rotating clutch structure in such prior art arrangements introduces substantial inertia forces. Furthermore, it is necessary to precisely balance the clutch, because of its large rotating mass, to eliminate inertia forces due to the eccentric mass distribution.

A principal feature and object of my invention is to provide a clutch structure of relatively high capacity but which does not require the radial dimensions necessary for a disc type clutch in a transmission system. In doing this I have provided a pair of cooperating cone clutch surfaces, one of which is carried by one clutch member and the other of which is formed on the pressure movable member. In this case the pressure movable member is in the form of a diaphragm piston which is connected in nonrotatable fashion to the other clutch member. The piston cooperates with the other clutch member to define an annular cavity around the piston. When the cavity is pressurized with fluid pressure, the piston deflects and shifts thereby causing its cone surface to engage the cooperating cone surface of the first clutch member. The piston is adapted to flex under pressure thereby allowing it to comply with the shape of the cone surface with which it engages.

Because of the flexibility of the piston itself, it is not necessary to maintain precise tolerances in cone geometry A relatively consistent and predictable clutch engaging characteristic is achieved under all operating conditions. This eliminates the undesirable clutch "squawk" noise that is characteristic of conventional cone clutches during engagement. The improved clutch structure of my invention is relatively free of friction drag forces. Such forces are usually present in a multiple disc clutch arrangement because of the sliding frictional drag of the individual clutch discs of the clutch assembly when the clutch is released.

BRIEF DESCRIPTION OF THE FIGURES OF THE DRAWINGS

FIGS. 1A & 1B show in longitudinal cross-sectional form a schematic version of a first embodiment of my invention.

PARTICULAR DESCRIPTION OF THE INVENTION

Figure 2:
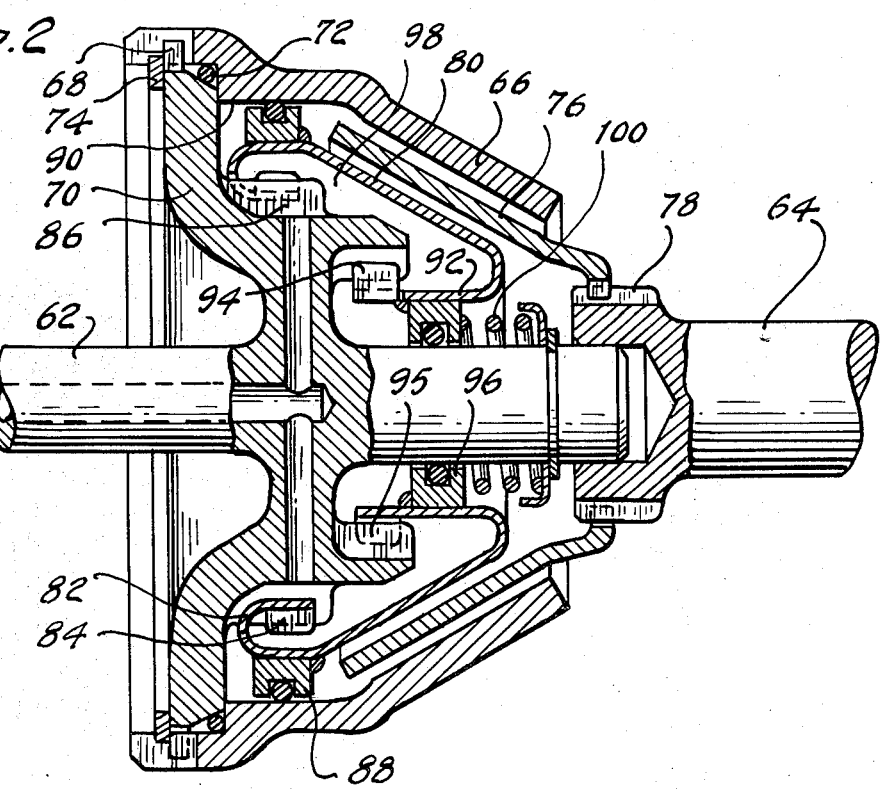
FIG. 2 shows in longitudinal cross-sectional form a schematic version of a second embodiment of my invention.

Numeral 10 designates in FIG. 1 one of a pair of torque delivery shafts for a clutch structure. For purposes of reference, the shaft 10 will be referred to as a power input shaft. A companion shaft 12, which may be the power output shaft, is situated coaxially with respect to the power input shaft 10. Torque is distributed between the shafts by the clutch structure of my invention. This includes a cone clutch element 14 having formed thereon the cone clutch surface 16 having an angle $\alpha$ with reference to a horizontal reference line or with respect to the axis of the cone of which the surface 13 is a part.

A second clutch element 18 having a generally conical shape is connected directly to the power output shaft 12. Clutch element 18 surrounds the clutch element 14.

Clutch element 18 is provided with a cavity 20 which surrounds the outer surface 16 of the element 14.

The cavity 20 surrounds the axis of the clutch structure, which is identified by reference character 22. The internal surface of the clutch element 18 forms a cylindrical section 24 at the right-hand thereof. Another cylindrical section 26 is formed at he left end of the clutch structure. The section 26 is located radially outwardly from the section 24 with respect to the axis.

A diaphragm piston cooperates with the cylindrical section 24 and 26 as shown at 28. Piston 28 comprises a first cylindrical portion 30, which slidably registers with cylinder section 24 of the clutch element 18. It includes also a cylindrical portion 32, which slidably registers with the cylindrical section 26 of the element 18. The region of the piston 28 intermediate the portions 32 and 30 is generally conical in form as shown at 34.

The left-hand margin of the portion 32 is formed with a flange having external teeth 36 which register with internal teeth 38 formed on the left-hand margin of the conical clutch element 18. The right-hand margin of the piston portion 30 also is formed with teeth 40 which register with internal teeth 42 formed on the right-hand end of the element 18. A sealing element such as an O-ring 44 is carried by the element 18, in sealing engagement with the piston portion 30. A corresponding O-ring 46 may be carried by the element 18 in sliding engagement with piston portion 32.

A clutch pressure plate 48 is located on the left-hand side of the outer margin on the cone element 14. It includes a radially extending margin 50 on which is formed radially extending teeth which engage the internal teeth 38. The pressure plate 50 is held axially fast by snap ring 52. Piston return springs 54 are situated between the pressure plate 48 and the left-hand margin of the piston portion 32 thereby tending normally to urge the piston 28 in a right-hand direction. Regardless of the axial position of the piston 28 relative to the clutch element 18, the right-hand margin of the piston portion 30 remains in locked engagement with the teeth 42; and the left-hand margin of the piston portion 32 remains in locked engagement with the teeth 38.

The intermediate portion 34 of the piston 28 covers the cavity 20 and cooperates with the cavity to define a pressure chamber when fluid is admitted to the fluid pressure chamber. The piston 28 is shifted in a left-hand direction until the cone surface of the piston 28 engages the cone surface 16. This will tend to shift the clutch element 14 thereby causing it to engage the pressure plate 48. At that time further shifting movement of the clutch element 14 cannot occur. An increase in the oil pressure in the cavity 20 then will cause the piston 28 to flex and to increase its frictional area of contact with the cone surface 16. To assist in this flexure, the intermediate portion 34 of the piston 28 is provided with angularly spaced flutes 56. These are in the form of projections located inclose relationship and spaced about the axis 22.

The cone angle for the surface 16 is designated in FIG. 1 by the symbol $\alpha$. The cone angle $\beta$ shown in FIG. 1 is the angle between a line parallel to the axis 22 and a line drawn through the centers of flexure 58 and 60 in the piston 28.

The center of flexure 60 occurs at the location of an annular undulation formed at the left-hand margin of the piston portion 30. The center of flexure 58 is formed at the annular undulation adjacent the right-hand margin of the piston portion 32.

Upon an increase in pressure in the chamber 20 the piston will deflect and gradually engage the cone surface 16. Automatic compensation occurs for any inaccuracies in the geometry of the clutch element 14 or the piston. Because of the inherent compliance of the flexible piston itself, this action will radially inward and without seizure whenever the angle $\alpha$ is slightly greater than the angle $\beta$. This is true, however, only when the radii of the seals 46 and 44 are approximately the same as the radii of their adjacent centers of flexure for piston 28.

In the FIG. 2 embodiment, numeral 62 designates one of a pair of concentric shafts, which may be the power input shaft. And numeral 64 designates the companion shaft, which may be the power output shaft. The reaction plate in this embodiment is conical in form as shown at 66. It is splined or keyed to external teeth 68 carried at the radially outward margin of the first clutch member 70. Shaft 62 is secured directly to the clutch member 70. Shaft 62 is secured directly to the clutch member 70. The joint between the reaction plate 66 and the clutch member 70 is made fluid tight by a fluid seal ring 72. The assembly is held axially fast by snap ring 74.

A clutch disc, which is conical in form, as shown at 76, is splined at its inner margin to the shaft 64, as shown at 78. It is situated directly adjacent the conical surface of the reaction pressure plate 66.

A flexible piston 78 is disposed directly adjacent the clutch member 70. The central region of the piston 80 is conical in form with a slope generally similar to the slope of the conical clutch plate 76, which is situated directly adjacent the inner surface of the clutch plate 76. The outer margin of the piston 80, as shown at 82 is in reentrant. It carries a tab 84, which engages radially extending abutments or teeth 86 formed on the clutch member 70. The margin 82 is secured to a seal ring 88 which carries a sealing element which slidably engages a cylindrical surface 90 formed in the pressure plate 66.

The radially inward margin of the piston 80 also is a reentrant form, as shown at 92. It also is formed with tabs 94 which engage teeth or lugs 95 formed on the clutch member 70. The margin 92 is connected directly to a second seal ring 96 which carries a seal element that slidably engages the shaft 62. The sealing rings 96 and 88 cooperate with the member 70 to define a pressure chamber 98. Piston 80 is normally urged in a left-hand direction by a piston return spring 100, which is anchored to the shaft 62 as shown.

When the pressure in the chamber 86 is increased, piston 80 will be shifted in a right-hand direction until clutching engagement occurs between the clutch element 76 and the pressure plate 66. As in the previous embodiment of FIG. 1, full compliance occurs during clutch engagement because of the flexing characteristic of the piston 80.

In the FIG. 1 embodiment, friction material can be applied, if this is desired, to the piston and the the pressure plate. The cone shaped clutch element 14 in these circumstances will act as a heat sink to absorb the energy created during clutch engagement. In the FIG. 2 version it would be desirable if the friction material would be formed on the conical shaped clutch plate 76 rather than on the piston because the fluid within the cavity or chamber 98 in these circumstances then may act as a heat sink. The insulation of the fluid by the friction material in the FIG. 1 embodiment may destroy the heat sink characteristics of the fluid, but the clutch element 14 should be capable of performing the heat absorption function.

Figure 3:
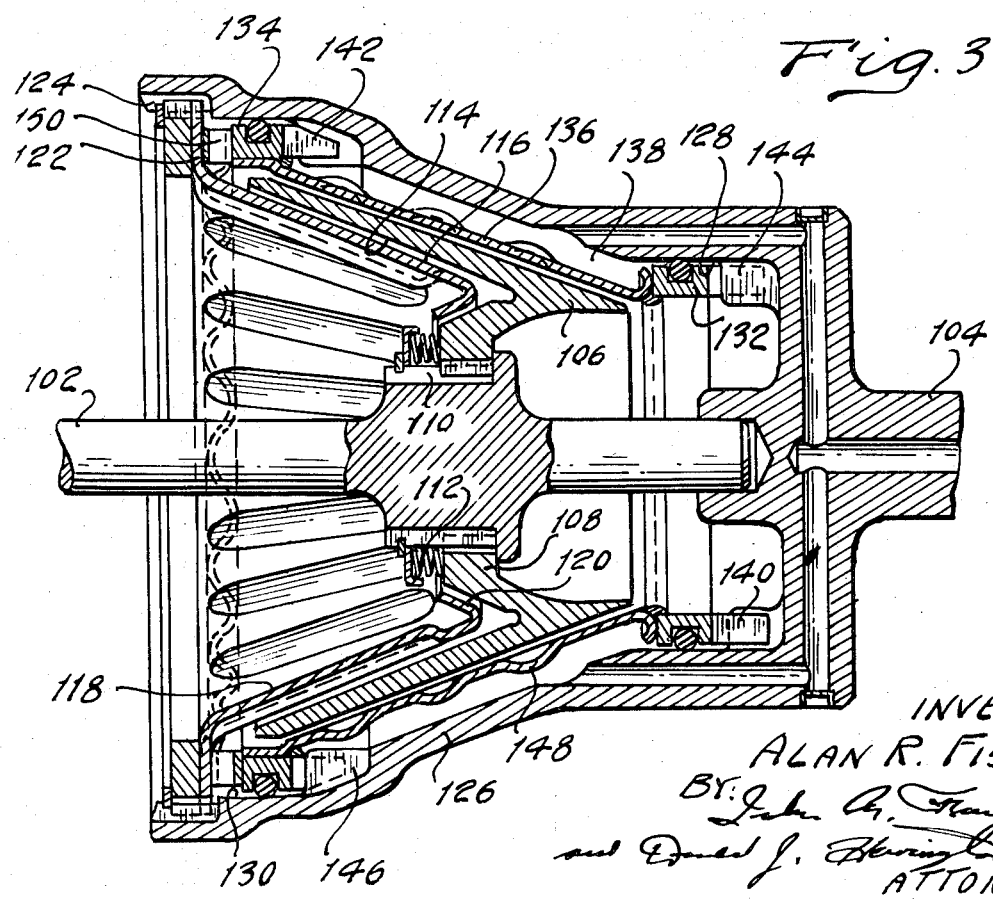
FIG. 3 shows in longitudinal cross-sectional form a schematic version of a third embodiment of my invention.

In FIG. 3 the power input shaft is designated at 102, and the power output shaft is designated at 104. The clutch plate is this case is conical, as shown at 106. It is splined at its hub 108 to external splines 110 carried by the shaft 102. A return spring 112 is situated between the hub 108 and an anchor carried by the shaft 102.

The main body portion of the plate 106 is conical in form to define a cone surface 114. This is situated directly adjacent cone surface 116 formed on reaction plate 118. This plate can be formed with ribs, as indicated in FIG. 3, to provide rigidity and to reduce deflection. If desired, the radially inward margin 120 of the pressure plate 118 may be adapted to register with the hub 108 for added support when the clutch is applied.

The radially outward margin 122 of the plate 118 is keyed or splined to internal teeth 124 carried by the outer margin of the clutch member 126. This member in turn is connected directly to the shaft 104.

Member 126 is generally conical in form, but it is formed with two cylindrical portions 128 and 130. In this respect it is somewhat similar to the FIG. 1 embodiment.

A seal ring 132 is slidably engaged with the cylindrical surface 128. A corresponding seal ring 134 slidably engages the cylindrical surface 130. The conical shaped piston 136 is connected directly to seal ring 132 and 134. The intermediate portion of the piston 136 is flexible as in the other embodiments. The piston 136 cooperates with the member 126 to define a pressure cavity 138.

Torque is transmitted between the piston 136 and the member 126 through teeth or lugs 140 and 142 carried, respectively, by the seal rings 132 and 134. Member 136 is formed with teeth or lugs 144 which register with the teeth or lugs 140, and it is formed also with teeth or lugs 146 which register with the teeth or lugs 142.

If desired, piston 136 can be formed with indentations 148 which produces progressive compliance between the engaging surfaces of the clutch as the pressure in the chamber 138 is increased.

Upon an increase in the clutch pressure, the piston 136 will cause the plate 106 to shift in a left-hand direction until the pressure plate 118 is engaged. A further clamping pressure will cause the shafts 102 and 104 to be locked together as torque is distributed therethrough. The piston is normally urged in a right-hand direction by a piston return spring 150, which is in the form of a wave washer which engages directly the outer margin 122.

I claim:

1. A friction torque establishing device adapted to deliver torque between a driving member and a driven member, a cone clutch element connected to one of said members, a second clutch element, a flexible piston carried by said second clutch element and adapted to shift relative thereto in an axial direction, said piston having a conical portion, means for slidably sealing one margin of said conical portion and other means for slidably sealing the other margin of said conical portion on said second clutch element, said piston cooperating with said second clutch element to define therebetween a fluid pressure chamber, means for normally shifting said piston away from the conical surface of said first 146 clutch element, said piston frictionally engaging said first clutch element upon an increase in the pressure in said pressure chamber thereby causing said piston to deflect thus providing full compliance between the engaging cone surfaces, said clutch element being adapted to shift along the principal axis of said device in response to the engaging pressure of said piston, and a pressure plate carried by said second clutch element in the path of movement of said first clutch element thereby limiting the amount of axial shifting movement of said first clutch element.

2. The combination as set forth in claim 1 wherein said pressure plate has a cone surface adapted to register with a cone surface of said first clutch element, said first clutch element being a conical clutch plate situated between said piston and said pressure plate, said clutch plate being secured to one of said members and adapted to move axially with respect thereto.

3. The combination as set forth in claim 1 wherein said clutch element is adapted to shift along the axis of said device in response to the engaging pressure of said piston, and a pressure plate carried by said second clutch element in the path of movement of said first clutch element, thereby limiting the amount of axial shifting movement of said first clutch element, said piston having a geometry that differs from the geometry of the cone surface of said first clutch element whereby progressive compliance is achieved upon an increase in the pressure in said pressure chamber upon engagement of said clutch.

4. The combination as set forth in claim 2 wherein said pressure plate has a cone surface adapted to register with the cone surface of said first clutch element, said first clutch element being a conical clutch plate situated between said piston and said pressure plate, said clutch plate being secured to one of said members and adapted to move axially with respect thereto, said piston having a geometry that differs from the geometry of the cone surface of said first clutch element whereby progressive compliance is achieved upon an increase in the pressure in said pressure camber upon engagement of said device.

5. A friction torque establishing device adapted to deliver torque between a driving member and a driven member, a cone clutch element connected to one of said members, a second clutch element, a flexible piston carried by said second clutch element and adapted to shift relative thereto in an axial direction, said piston having a conical portion, means for slidably sealing one margin of said conical portion and other means for slidably sealing the other margin of said conical portion on said second clutch element, said piston cooperating with said second clutch element to define therebetween a fluid pressure chamber, means for normally shifting said piston away from the conical surface of said first clutch element, said piston frictionally engaging said first clutch element upon an increase in the pressure in said pressure chamber thereby causing said piston to deflect thus providing full compliance between the engaging cone surfaces, said piston having a geometry that differs from the geometry of the cone surface of said first clutch element whereby progressive compliance is achieved upon an increase in the pressure in said pressure chamber upon engagement of said device.